(12) United States Patent
Shrivastava et al.

(10) Patent No.: US 11,764,365 B2
(45) Date of Patent: Sep. 19, 2023

(54) FUEL CELL ELECTRODE WITH PATTERNED MICROPOROUS LAYER AND METHODS OF FABRICATING THE SAME

(71) Applicant: HYDROGENICS CORPORATION, Mississauga (CA)

(72) Inventors: Udit N. Shrivastava, East York (CA); Arvind V. Harinath, Oakville (CA); Jennie Eastcott, Oakville (CA)

(73) Assignee: HYDROGENICS CORPORATIONS, Mississauga (CA)

( * ) Notice: Subject to any disclaimer, the term of this patent is extended or adjusted under 35 U.S.C. 154(b) by 0 days.

(21) Appl. No.: 17/666,269

(22) Filed: Feb. 7, 2022

(65) Prior Publication Data

US 2022/0352524 A1 Nov. 3, 2022

Related U.S. Application Data

(60) Provisional application No. 63/182,385, filed on Apr. 30, 2021.

(51) Int. Cl.
*H01M 4/86* (2006.01)
*H01M 4/88* (2006.01)

(52) U.S. Cl.
CPC ........... *H01M 4/8626* (2013.01); *H01M 4/88* (2013.01)

(58) Field of Classification Search
CPC ....... H01M 2008/1095; H01M 4/8605; H01M 4/8626; H01M 4/8657; H01M 4/88; H01M 4/8807; H01M 8/0234; H01M 8/0245; Y02E 60/50
See application file for complete search history.

(56) References Cited

U.S. PATENT DOCUMENTS

| | | |
|---|---|---|
| 8,263,259 B2 | 9/2012 | Kearl |
| 8,945,790 B2 | 2/2015 | Lu |
| 9,276,273 B2 | 3/2016 | Steinbach |
| 9,461,311 B2 | 10/2016 | Lu |
| 2008/0206615 A1 | 8/2008 | Nicotera et al. |
| 2009/0017344 A1 | 1/2009 | Darling |
| 2009/0280389 A1 | 11/2009 | Tanaka |
| 2011/0151352 A1 | 6/2011 | Wilde et al. |
| 2016/0172692 A1 | 6/2016 | Han et al. |
| 2016/0329586 A1 | 11/2016 | Ninan et al. |

FOREIGN PATENT DOCUMENTS

| | | |
|---|---|---|
| CN | 103855408 | 6/2014 |
| CN | 109509887 | 3/2019 |
| DE | 112005001910 | 9/2007 |
| DE | 102008038202 | 4/2009 |
| DE | 102015208239 | 11/2015 |
| EP | 2337128 | 6/2011 |
| KR | 101881139 | 1/2014 |
| WO | 2007/117230 | 10/2007 |
| WO | 2019/139415 | 7/2019 |

*Primary Examiner* — Victoria H Lynch
(74) *Attorney, Agent, or Firm* — Barnes & Thornburg LLP

(57) ABSTRACT

The present disclosure generally relates to a fuel cell electrode having a patterned microporous layer and method of fabricating the same.

20 Claims, 3 Drawing Sheets

FUEL CELL ELECTRODE WITH PATTERNED MICROPOROUS LAYER AND METHODS OF FABRICATING THE SAME

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/182,385 filed on Apr. 30, 2021, the entire disclosure of which is hereby expressly incorporated herein by reference.

TECHNICAL FIELD

The present disclosure generally relates to a fuel cell having a patterned microporous layer and method of fabricating the same.

BACKGROUND

Fuel cell systems are known for their efficient use of fuel to develop direct current (DC) and/or alternating current (AC) electric power. Fuel cells, such as proton exchange membrane fuel cells (PEMFCs), may operate in large-scale power systems that provide energy to satisfy industrial and municipal needs. In addition, fuel cell may be useful for smaller or portable applications, such as powering cars, trucks, or other industrial vehicles and equipment. Other common types of fuel cells include phosphoric acid fuel cells (PAFCs), molten carbonate fuel cells (MCFCs), and solid oxide fuel cells (SOFC).

Fuel cells are typically amassed in series or in parallel in an assembly to form a fuel cell stack to produce electrical power at useful voltages or current to support a specific application. Interconnected structures are often used to connect or couple adjacent fuel cells in series or in parallel to form the fuel cell stack or a fuel cell system. A fuel cell produces electricity by electrochemically combining a fuel and an oxidant across an ionic conducting layer, the electrolyte, for which many fuel cells are named.

The electrode of a fuel cell is often comprised of a catalyst layer, a microporous layer (MPL), and a gas diffusion layer (GDL). During fuel cell operations at any current voltage or density, liquid water present in the catalyst layer of the fuel cell electrode may cause flooding. Excess water can also inhibit oxygen diffusion from the gas diffusion layer (GDL) to the catalyst layer.

Usually, the microporous layer (MPL) is deposited between the gas diffusion layer (GDL) to separate the catalyst layer from the gas diffusion layer (GDL). The microporous layer (MPL) layer selectively removes water away from the catalyst layer. The microporous layer also allows for the flow of gases (e.g., oxygen) from the gas diffusion layer (GDL) into the catalyst layer.

Described herein is a fuel cell comprising a patterned microporous layer (MPL). A method for fabricating the patterned microporous layer (MPL) is also comprised herein. The patterned microporous layer of the present disclosure is located between the gas diffusion layer (GDL) and the catalyst layer of an electrode and comprises flow pathways for effectively removing liquid water away from the catalyst layer and the gas diffusion layer (GDL).

SUMMARY

Embodiments of the present invention are included to meet these and other needs. In one aspect, the present disclosure is directed to a fuel cell comprising a catalyst layer, a patterned microporous layer comprising a plurality of pores that enable gas diffusion and one or more flow pathways that selectively enable flow of liquid water, and a gas diffusion layer.

In one embodiment, the patterned microporous layer of the fuel cell comprises a plurality of pores comprising a diameter of about 50 nm to about 300 nm. In one embodiment, the patterned microporous layer of the fuel cell comprises one or more flow pathways comprising either rectangular, square, or circular structures with at least one dimension in a range of about 2 μm to about 50 μm. In one embodiment, the patterned microporous layer of the fuel cell comprises a first flow pathway separated from a second flow pathway by a pitch distance of about 2 μm to about 100 μm. In one embodiment, the one or more flow pathway is hydrophobic or hydrophilic. In one embodiment, the plurality of pores is hydrophobic.

In another aspect, the present disclosure is directed to a method of fabricating a patterned microporous layer in a fuel cell comprising, comprising mixing a photoresist and a plurality of $SiO_2$ nanoparticles to form a slurry in the patterned microporous layer, coating the slurry on a gas diffusion layer (GDL). Then, selectively exposing the coated gas diffusion layer (GDL) to UV light, applying a developer solution to the gas diffusion layer (GDL) to form one or more flow pathways in the patterned microporous layer, carbonizing the patterned microporous layer, removing the plurality of $SiO_2$ nanoparticles from the patterned microporous layer to create a plurality of pores, and fluorinating the patterned microporous layer.

In one embodiment, the plurality of solid $SiO_2$ nanoparticles comprise a diameter of about 50 nm to about 300 nm. In one embodiment, the slurry comprises a negative photoresist or a positive photoresist.

In one embodiment, the method selectively exposing the slurry to UV light comprises a mask.

BRIEF DESCRIPTION OF THE DRAWINGS

FIG. 3 is an illustration of a step of a method embodiment for fabricating the patterned microporous layer (MPL) of a fuel cell electrode comprising coating the gas diffusion layer (GDL) of a fuel cell with the slurry.

FIG. 4A is an illustration of a step of a method embodiment for fabricating the patterned microporous layer (MPL) of a fuel cell electrode comprising aligning a chrome mask on a positive photoresist and exposing to UV light.

FIG. 4B is an illustration of a step of a method embodiment for fabricating the patterned microporous layer (MPL)

of a fuel cell electrode comprising aligning a chrome mask on a negative photoresist and exposing to UV light.

FIG. 5 is an illustration of a step of a method embodiment for fabricating the patterned microporous layer (MPL) of a fuel cell electrode comprising exposing gas diffusion layer (GDL) of a fuel cell to a developer solution.

FIG. 6A is an illustration of a step of a method embodiment for fabricating the patterned microporous layer (MPL) of a fuel cell electrode comprising carbonizing the gas diffusion layer (GDL) coated with the slurry prior to removal of $SiO_2$ nanoparticles from the gas diffusion layer (GDL).

FIG. 6B is an illustration of a step of a method embodiment for fabricating the patterned microporous layer (MPL) of a fuel cell electrode comprising removal of $SiO_2$ nanoparticles from the gas diffusion layer (GDL) prior to carbonizing the gas diffusion layer (GDL) coated with the slurry.

These and other features, aspects, and advantages of the present invention will become better understood when the following detailed description is read with reference to the accompanying drawings described herein. Reference is also made to the accompanying drawings that form a part hereof and in which is shown by way of illustration specific embodiments in which the invention may be practiced. These embodiments are described in sufficient detail to enable those skilled in the art to practice what is claimed and it is to be understood that other embodiments may be utilized and that logical, mechanical, and electrical changes may be made without departing from the spirit and scope of the claims. The following detailed description is, therefore, not to be taken in a limiting sense.

DETAILED DESCRIPTION

The present disclosure is directed to a fuel cell or a fuel cell system comprising an electrode. The present disclosure is also directed to a method for fabricating a patterned microporous layer (MPL). Typically, the patterned microporous layer (MPL) is located between the gas diffusion layer (GDL) and the catalyst layer of a fuel cell electrode.

Figure 1A:
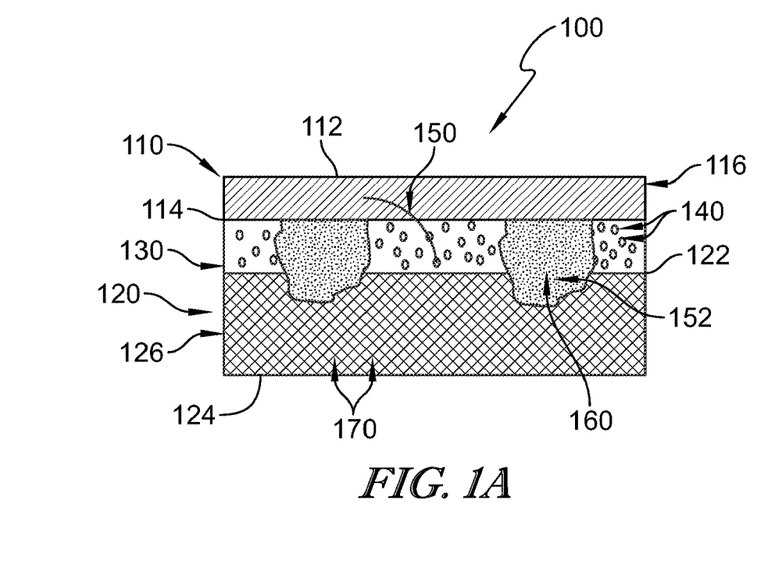
FIG. 1A is an illustration of an embodiment of a fuel cell electrode having a catalyst layer, a patterned microporous layer (MPL), and a gas diffusion layer (GDL).

One embodiment of a fuel cell electrode 100 of the present disclosure is shown in FIGS. 1A-ID. The catalyst layer 110 is separated from a gas diffusion layer (GDL) 120 by a patterned microporous layer (MPL) 130. In one exemplary embodiment of the fuel cell electrode 100, as shown in FIGS. 1A-ID, the catalyst is atop or above the microporous layer (MPL) 130, which is atop or above the gas diffusion layer (GDL) 120. In another embodiment, the catalyst layer 110 is below or beneath the microporous layer (MPL) 130, which is below or beneath the gas diffusion layer (GDL) 120.

The patterned microporous layer (MPL) of the fuel cell electrode 100 of the present disclosure comprises one or more flow pathways or flow features for directing and/or removing liquid water from the catalyst layer 110. In one embodiment, the microporous layer (MPL) 130 may be patterned with one or more pores 140, such as a plurality of pores. In another embodiment, the microporous layer (MPL) 130 may be patterned with one or more pores 140 and one or more flow features or "features" 160.

Figure 1B:
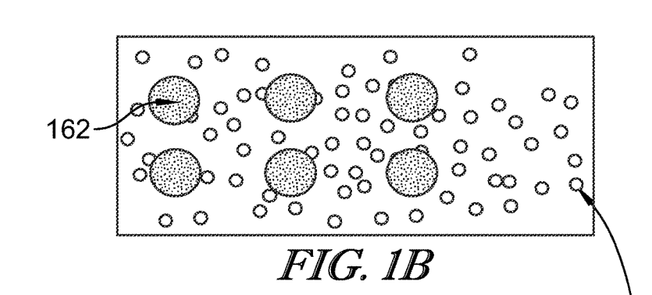
FIG. 1B is an illustration of an embodiment of a patterned microporous layer (MPL) with circular flow pathways.
Figure 1C:
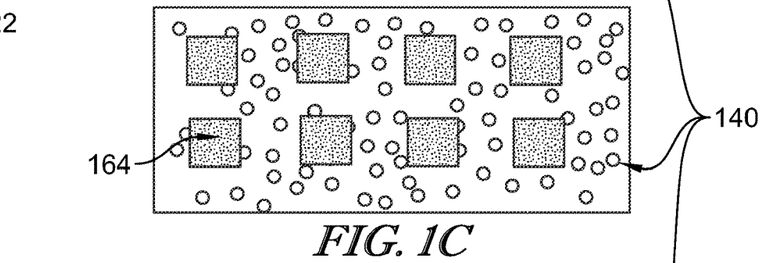
FIG. 1C is an illustration of an embodiment of a patterned microporous layer (MPL) with square flow pathways.
Figure 1D:
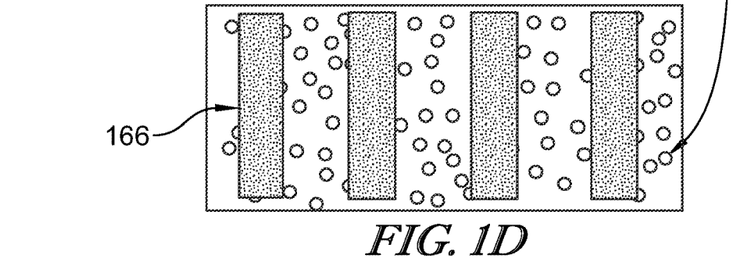
FIG. 1D is an illustration of an embodiment of a patterned microporous layer (MPL) with rectangular flow pathways.

In one embodiment, the flow pathways or flow features 160 may be any size or shape. In one embodiment, as shown in FIGS. 1B-ID, the flow features 160 may be circular 162, square 164, or rectangular 166. In other embodiments, the flow pathways, or flow features 160 may be of a different shape. In some embodiments, the flow pathways, or flow features 160 may be in the form of holes, channels, or some other form.

In some embodiments, the flow features 160 created in the patterned microporous layer (MPL) 130 may allow for liquid water 152 to be removed away from the catalyst layer 110. For example, in some embodiments, the flow pathways or flow features 160 may connect the catalyst layer 110 to the gas diffusion layer (GDL) 120. In one embodiment, the top surface 112, the bottom surface 114, or the body 116 of the catalyst layer 110 may be connected to any one or more of the top surface 122, the bottom surface 124, or the body 126 of the gas diffusion layer 120 by the flow features 160.

In some embodiments, flow pathways or features 160 may be hydrophilic or hydrophobic. In other embodiments, the flow features 160 may have a diameter that is large enough to allow the entry or movement of liquid water 152 through the flow pathways 160. In one embodiment, the size or diameter of the flow pathways or flow features 160 comprised by the patterned microporous layer (MPL) 130 may range from about 2 micron (μm) to about 50 micron (μm).

In some embodiments, the size or the diameter of the flow pathways 160 in the patterned microporous layer (MPL) 130 may range from about 2 μm to about 10 μm. In other embodiments, the size or the diameter of flow features 160 in the patterned microporous layer (MPL) 130 may range from about 10 μm to about 20 μm. In other embodiments, the size or the diameter of flow pathways or features 160 in the patterned microporous layer (MPL) 130 may range from about 20 μm to about 30 μm. In some further embodiments, the size or the diameter of flow features 160 of the patterned microporous layer (MPL) 130 may range from about 30 μm to about 50 μm.

A pitch distance of the present disclosure is the distance between a center point of one flow feature 160 to the center point of another flow feature or pathway 160. So, the pitch distance in an inter-feature measurement. In one embodiment, the pitch distance of and/or between two or more flow pathways 160 in the patterned microporous layer (MPL) 130 may range from about 2 μm to about 100 μm. In some embodiments, the pitch distance of flow features 160 in the patterned microporous layer (MPL) 130 may range from about 2 μm to about 10 μm.

In other embodiments, the pitch distance of the flow pathways or flow features 160 in the patterned microporous layer (MPL) 130 may range from about 10 μm to about 30 μm. In other embodiments, the pitch distance of the flow pathways or flow features 160 in the patterned microporous layer (MPL) 130 may range from about 30 μm to about 50 μm. In some further embodiments, the pitch distance of the flow pathways or flow features 160 in the patterned microporous layer (MPL) 130 may range from about 50 μm to about 75 μm. In other embodiments, the pitch distance of the flow pathways or flow features 160 in the patterned microporous layer (MPL) 130 may range from about 75 μm to about 100 μm.

In one embodiment, the pitch distance of the flow pathways or flow features 160 may be equal to or about equal to the sum of the thickness of the patterned microporous layer (MPL) 130 and the thickness of the catalyst layer 110. In other embodiments, the pitch distance of the flow pathways or flow features 160 may be more than the sum of the thickness of the patterned microporous layer (MPL) 130 and the thickness of the catalyst layer 110. In an exemplary embodiment, the pitch distance of the flow pathways or flow features 160 is at least equal to the sum of the thickness of the patterned microporous layer (MPL) 130 and the thickness of the catalyst layer 110.

For example, if the thickness of the patterned microporous layer (MPL) 130 is about 10 μm and the thickness of the catalyst layer 110 is about 20 μm, in an exemplary embodiment, the pitch distance of the flow pathways or flow features 160 may be at, about, or more than 30 μm. For example, in this embodiment, the pitch distance may range from about 30 μm to about 50 μm or from about 30 μm to about 60 μm. In another embodiment, if the thickness of the patterned microporous layer (MPL) 130 is about 10 μm and the thickness of the catalyst layer 110 is about 20 μm, the pitch distance of the flow pathways or flow features 160 may not be greater than about 30 μm.

In a further embodiment, the MPL pores 140 may allow for the entry and/or movement of gases 150 (e.g., oxygen or hydrogen). In one embodiment, the pores 140 in the patterned microporous layer (MPL) 130 ("MPL pores") may be hydrophobic. In another embodiment, the MPL pores 140 may have a size or diameter that is small enough to prevent liquid water 152 from entering or moving through the MPL pores 140. In a further embodiment, water does not enter the MPL pores 140.

In one embodiment, the size or diameter of the MPL pores 140 in the patterned microporous layer (MPL) 130 may range from about 50 nm to about 300 nm, including any specific size, diameter, or range within that range. In some embodiments, the diameter of the MPL pores 140 may range from about 50 nm to about 100 nm, including any specific size or diameter within that range. In other embodiments, the diameter of the MPL pores 140 may range from about 50 nm to about 75 nm, including any specific size or diameter within that range. In other embodiments, the diameter of the MPL pores 140 may range from about 100 nm to about 200 nm, including any specific size or diameter within that range. In some further embodiments, the diameter of the MPL pores 140 may range from about 200 nm to about 300 nm, including any specific size or diameter within that range.

As shown in FIG. 1A, one embodiment of the gas diffusion layer (GDL) 120 may be patterned with small pores 170, shown as a plurality of "x"s. In one embodiment, the diameter of the pores 170 in the gas diffusion layer (GDL) 120 ("GDL pores") may range from about 50 nm to about 100 nm, including any specific size, diameter, or range within that range. In some embodiments, the size of the diameter of the GDL pores 170 may range from about 50 nm to about 60 nm, including any specific size or diameter within that range. In other embodiments, the diameter of the GDL pores 170 120 may range from about 60 nm to about 70 nm, including any specific size or diameter within that range. In other embodiments, the diameter of the GDL pores 170 may range from about 70 nm to about 100 nm, including any specific size or diameter within that range. In some further embodiments, the diameter of the GDL pores 170 may be greater than about 100 nm.

Figure 2A:
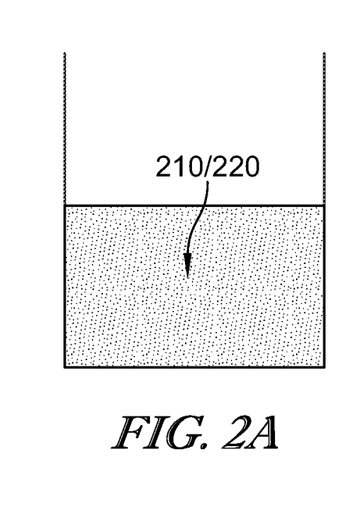
FIG. 2A is an illustration of a step of a method embodiment for fabricating the patterned microporous layer (MPL) of a fuel cell electrode comprising diluting a photoresist.

The method of fabricating the patterned microporous layer (MPL) 130 of the current disclosure comprises creating the flow pathways and features 160 and the MPL pores 140. One embodiment of the method of fabricating the patterned MPL comprises a photoresist 210, as shown in FIG. 2A. In some embodiments, the photoresist 210 is a liquid, such as a liquid solution. In one embodiment, the photoresist 210 is a positively charged (+) photoresist (e.g., AZP4110) or a negatively charged (−) photoresist (e.g., SU-8) solution. In some embodiments, the positive or negative photoresist 210 is diluted with solvents, such as propylene glycol methyl ether acetate or PGMEA.

Figure 2B:
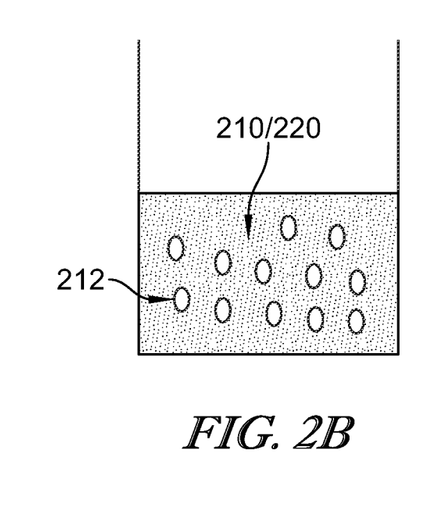
FIG. 2B is an illustration of a step of a method embodiment for fabricating the patterned microporous layer (MPL) of a fuel cell electrode comprising mixing the diluted photoresist with $SiO_2$ nanoparticles to form a slurry.

In the illustrative embodiment of the present method shown in FIG. 2B, solid silica oxide ($SiO_2$) nanoparticles 212 are mixed with the liquid diluted photoresist 210 to form a slurry 220. In one embodiment, the diameter of the solid $SiO_2$ nanoparticles 212 range from about 50 nm to about 300 nm, including any specific size, diameter, or range within that range. In some embodiments, the percentage of the solid component (e.g., solid $SiO_2$ nanoparticles 212) of the slurry 220 in the liquid component (e.g., diluted liquid positive (+) or negative (−) photoresist 210) of the slurry 220 varies from about 5% to about 15%, including any specific percentage within that range.

In other embodiments, the percentage of the solid component (e.g., solid $SiO_2$ nanoparticles 212) of the slurry 220 in the liquid component (e.g., diluted liquid positive (+) or negative (−) photoresist 210) of the slurry 220 varies from about 15% to about 25%, including any specific or range of percentage within that range. In some further embodiments, the percentage of the solid component (e.g., solid $SiO_2$ nanoparticles 212) of the slurry 220 to the liquid component (e.g., diluted liquid positive (+) or negative (−) photoresist 210) of the slurry 220 may be more than about 25% or less than about 5%.

Figures 3, 4A, 4B, 5, 6A, 6B:
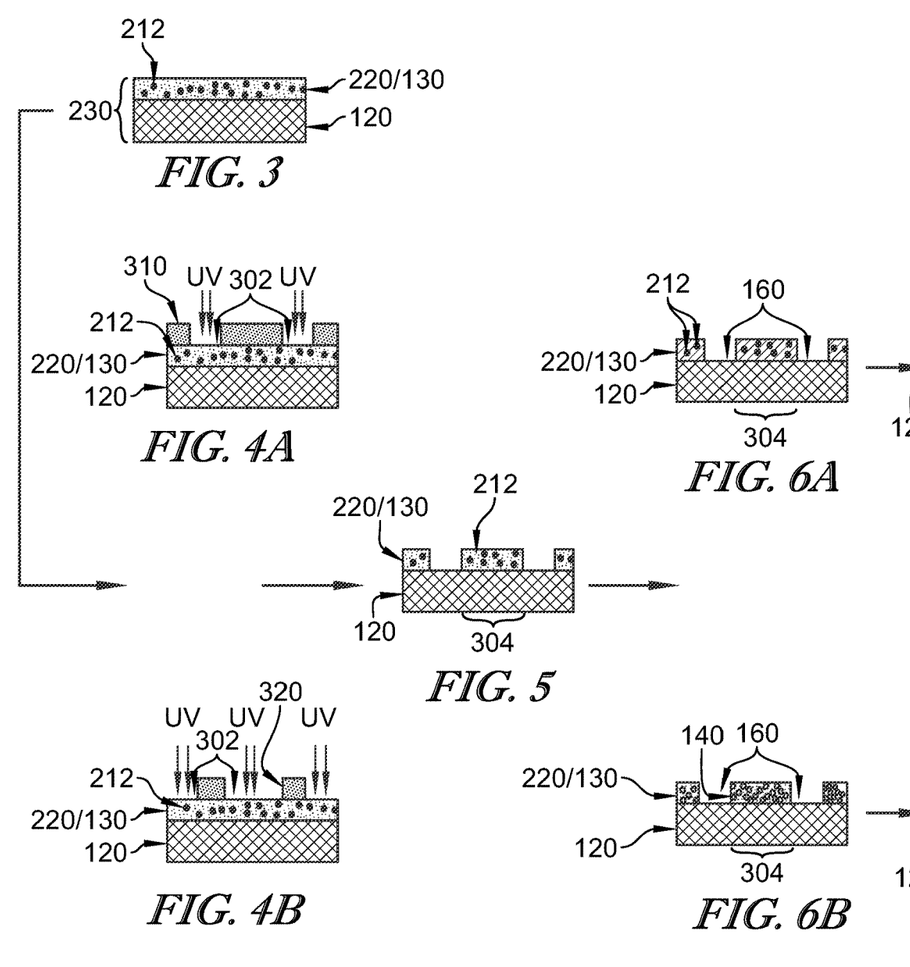

In one embodiment, the $SiO_2$ nanoparticles 212 and the liquid photoresist 210 of the slurry 220 are mixed. The mixing of the slurry 220 may occur by any method known in the art. Illustrative methods to mix the slurry 220 include but are not limited to ultrasonication, magnetic stirring, bead milling, mechanical agitation (e.g., agitation with a blade, propeller etc.), probe sonication, and/or high shear mixing (e.g., microfluidization). In one embodiment, as shown in FIG. 3, the slurry 220 containing the photoresist 210 and $SiO_2$ nanoparticles 212 is coated on a substrate comprising the gas diffusion layer (GDL) 120 to form a MPL-GDL substrate 230.

The MPL-GDL substrate 230 may be then heated to high temperatures. For example, in an illustrative embodiment, the MPL-GDL substrate 230 may be heated to high temperatures ranging from about 80° C. to about 120° C., including any specific or range of temperature comprised within that range. In addition the MPL-GDL substrate 230 may be heated at high temperatures for a timeframe ranging from about 10 to about 120 seconds, including any specific or range of time period comprised within that range. In an illustrative embodiment, the MPL-GDL substrate 230 may be heated to high temperatures by any mechanism known in the art, such as by baking.

Once formed, a mask 310/320 may be provided atop the MPL-GDL substrate 230. In one embodiment, the mask 310/320 may be directly aligned against the MPL-GDL substrate 230, such as to be in contact with the coated slurry 220. In other embodiments, the mask 310/320 may be indirectly aligned against the MPL-GDL substrate 230, such that the mask 310/320 is not in direct contact with the coated slurry 220.

The mask 310/320 may be made of any material that may block or cover the coated slurry 220 of the microporous layer 130 of the MPL-GDL substrate 230. For example, the mask 310/320 may be made of any material that would block or prevent the penetration of UV light from reaching the coated slurry 220. In an illustrative embodiment, the mask 310/320 may comprise or be made of chrome.

In some embodiments of the MPL-GDL substrate 230, the MPL comprises a positive (+) photoresist, as shown in FIG. 4A. In other embodiments of the MPL-GDL substrate 230, the patterned MPL 130 comprises a negative (−) photoresist, as shown in FIG. 4B. In the present method, the mask 310/320 is placed atop the photoresist in order to block or mask a portion of the coated slurry 220 comprising the photoresist 210 and $SiO_2$ nanoparticles 212 that lies directly below the mask 310/320.

In one embodiment, a mask 310 is placed atop the positive (+) photoresist as shown in FIG. 4A and is aligned against slurry 220 coated gas diffusion layer (GDL) 120. In another embodiment, a mask 320 is placed atop negative (−) photoresist as shown in FIG. 4B and is aligned against the slurry 220 coating the gas diffusion layer (GDL) 120. In some embodiments, the mask 310/320 may be in direct contact with the photoresist of the slurry 220 forming the patterned MPL 130 layer of the MPL-GDL substrate 230, while in other embodiments, the mask 310/320 may not be in direct contact with the photoresist layer of the MPL-GDL substrate 230.

In an embodiment having positive (+) photoresist, as shown in FIG. 4A, the flow pathways and flow features 302/160 of the patterned MPL 130 are formed in regions where the mask 310 exposes the slurry 220 coating the gas diffusion layer (GDL) 120 to ultraviolet (UV) light. The UV light loosens the slurry 220 of the positive (+) photoresist atop the gas diffusion layer (GDL) 120, so that it can be dissolved in a developer solution. The removal of the coated slurry 220 exposed to the UV light creates the flow features 302/160 where the mask 310 is absent.

In the case of a negative (−) photoresist, as shown in FIG. 4B, the flow pathways or flow features 302/160 are formed in the regions where the mask 320 protects the slurry 220 from the UV light. The UV light hardens the negative (−) photoresist in the slurry 220 not covered or protected by the mask 320 and exposed to the UV light, such that it is not dissolvable by a developer solution or solvent. The hardening of the slurry 220 exposed to the UV light creates the flow features 160 under the mask 320 where the slurry 220 is not exposed to the UV light.

Typically, the UV light is provided to the slurry 220 at a wavelength ranging from about 200 nm to about 500 nm, including any specific wavelength comprised within that range. In one embodiment, the UV light may be provided to the slurry 220 at about 300 to about 500 nm, such as about 300 nm or about 350 nm. The UV light is also applied to the slurry 220 for a timeframe ranging from about 2 to 30 seconds, including any specific time period comprised within that range.

In some embodiments, as shown in FIG. 5, after the slurry 220 coating the gas diffusion layer (GDL) 120 is exposed to UV light, exposed and unexposed regions of the slurry 220 are removed by applying a developer solution. The developer solution is applied to the slurry 220 by agitation and/or washing for about 2 seconds to about 120 seconds, including any specific time period comprised within that range.

In on embodiment, the developer solution is a solvent. In another embodiment, the developer solution is an organic solvent. In one embodiment, the type of developer solution depends on and is specific to the type of photoresist 210 that is used. For example, a positive (+) photoresist may utilize or require a specific developer solution, while a negative (−) photoresist may utilize or require the same or a different specific developer solution or solvent. In one embodiment, a developer solution or solvent for a photoresist may include, but is not limited to PGMEA.

In one embodiment, the mask 310/320, the slurry 220 that forms the patterned MPL 130, and the UV light create one or more circular 162, square 164, or rectangular 166 flow pathways or flow features 160 in the patterned MPL 130. In some embodiments, the dimension and/or shape of the flow pathways or flow features 160 may be designed and/or implemented based on user need. In some embodiments, the dimension and/or shape of the flow pathways or flow features 160 may depend on the dimension and/or shape of the mask feature or characteristics 302. In other embodiments, the mask 310/320 may have mask features or characteristics 302 (e.g., gaps, holes, channels, etc.) to create the flow pathways or flow features 160. In some embodiments, the mask features or characteristics 302 of the mask 310/320 dictate, produce, and/or directly correlate with the shape, size, and/or depth of the resulting flow pathways or flow features 160.

In one embodiment, the shape, size, location, number, and/or depth of the resulting flow pathways or flow features 160 may be determined, selected, and/or controlled by a human operator or designer. In another embodiment, the shape, size, location, number, and/or depth of the resulting flow pathways or flow features 160 may be determined, selected, and/or controlled by imprinting a pattern on or into the mask 310/320.

Once the flow pathways 160 are created, the mask 310/320 is removed from the MPL-GDL substrate 230 that comprises the newly created flow features 160. In one embodiment, the flow pathways 160 may only penetrate the patterned MPL 130 of the MPL-GDL substrate 230. In another embodiment, the flow pathways or flow features 160 may only penetrate the GDL 120. However, in an exemplary embodiment, the flow pathways 160 may penetrate both the patterned MPL 130 and the GDL 120 of the MPL-GDL substrate 230. In some embodiments the flow pathways 160 do not at all or only minimally penetrate the catalyst layer 110 of the fuel cell electrode 100.

In one embodiment the mask 310/320 may have mask features 302 (e.g., gaps, holes, channels etc.) that range from about 2 µm to about 50 µm, including any specific size or range comprised within that range. The mask features are used to create the one or more circular 162, square 164, or rectangular 166 flow pathways or flow features 160 in the patterned MPL 130. In some embodiments, the size of the mask features 302 may range from about 2 µm to about 10 µm. In other embodiments, the size of the mask features 302 may range from about 10 µm to about 20 µm. In other embodiments, the size of the mask features 302 may range from about 20 µm to about 30 µm. In some further embodiments, the size of the mask features 302 may range from about 30 µm to about 50 µm.

In one embodiment of the patterned MPL 130, created by the slurry 220, the mask 310/320 and UV light, of the MPL-GDL substrate 230 of the present fuel cell electrode 100, the size of the flow pathways or flow features 160 may range from about 2 µm to about 50 µm, including any specific distance comprised within that range. In some embodiments, the size of the flow features 160 may range from about 2 μm to about 10 μm. In other embodiments, the size of the flow pathways 160 may range from about 10 μm to about 20 μm. In other embodiments, the size of the flow pathways or flow features 160 may range from about 20 μm to about 30 μm. In some further embodiments, the size of the flow features 160 may range from about 30 μm to about 50 μm.

The pitch distance 304 is an inter-feature measurement of the flow pathways or flow features 160 and is an important and distinguishing characteristic of the present patterned MPL 130. Importantly, the pitch distance can be designed, manufactured, and/or manipulated by a user or an operator (e.g., a human). Since the size and shape of the flow pathways or flow features 160 may vary, the pitch distance 304 is also defined as the distance from the center point of the top surface of one flow pathway or flow feature 160 located in the patterned MPL 130 to the center point of the top surface of the next or closest flow feature 160 located in the patterned MPL 130 of the MPL-GDL substrate 230.

In one embodiment, the pitch distance 304 may range from about 2 μm to about 100 μm, including any specific or range of distance comprised within that range. In some embodiments, the pitch distance 304 may range from about 2 μm to about 10 μm. In other embodiments, the pitch distance 304 may range from about 10 μm to about 30 μm. In other embodiments, the pitch distance 304 in the patterned MPL 130 may range from about 30 μm to about 50 μm. In some further embodiments, the pitch distance 304 may range from about 50 μm to about 75 μm. In other embodiments, the pitch distance 304 may range from about 75 μm to about 100 μm.

Any method known in the art may be used to create or fabricate the patterned MPL of the present fuel cell electrode. Two illustrative method embodiments are described herein. These exemplary methods may be used to fabricate the patterned microporous layer (MPL) 130.

Figure 7A:
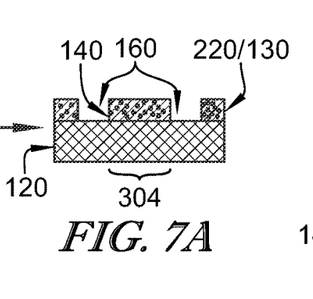
FIG. 7A is an illustration of a step of a method embodiment for fabricating the patterned microporous layer (MPL) of a fuel cell electrode comprising removal of $SiO_2$ nanoparticles from the gas diffusion layer (GDL) after to carbonizing the gas diffusion layer (GDL) coated with the slurry.
Figure 8:
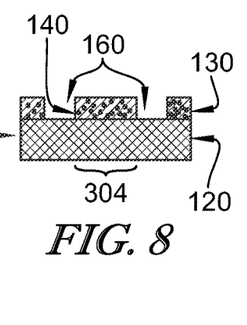
FIG. 8 is an illustration of a step of a method embodiment for fabricating the patterned microporous layer (MPL) of a fuel cell electrode comprising fluorinating the microporous layer (MPL) coated gas diffusion layer (GDL) of a fuel cell.

In one embodiment of the present method to fabricate the patterned microporous layer (MPL) 130 is collectively shown in FIGS. 6A, 7A, and 8. Typically, photoresist used to prepare the slurry 220 is comprised of a polymeric material that is nonconductive. However, when the photoresist is carbonized or exposed to carbon, the photoresist becomes electrically conductive. Heating the MPL-GDL substrate 230 carbonizes the slurry 220 and makes it electrically conductive, which is required for proper operation of a patterned MPL 130 of a fuel cell electrode 100.

As shown in FIG. 6A, the gas diffusion layer (GDL) 120 coated with slurry 220 to form the MPL-GDL substrate 230 is heated and/or baked at a temperature ranging from about 600° C. to 1500° C., including any specific temperature comprised within that range. In one embodiment, the MPL-GDL substrate 230 is heated and/or baked at a temperature that is about 900° C. or greater, such as a temperature ranging from about 900° C. to 1500° C., including any specific temperature comprised within that range. Typically, the MPL-GDL substrate 230 is baked or heated for about 30 to about 120 minutes, including any specific time period comprised within that range. In an exemplary embodiment, the heating or baking of the MPL-GDL substrate 230 occurs in a non-oxidizing atmosphere. In one embodiment, the non-oxidizing atmosphere comprises argon (Ar), nitrogen ($N_2$), hydrogen ($H_2$), and/or a vacuum.

Then, as shown in FIG. 7A, the slurry 220 coating the gas diffusion layer (GDL) 120 is exposed to an additional solution or solvent to extract, remove, or dissolve the $SiO_2$ nanoparticles 212 out of the slurry 220. In one embodiment, the solution or solvent to extract, remove, or dissolve the $SiO_2$ nanoparticles 212 out of the slurry 220 may be sodium hydroxide (NaOH). In another embodiment, the solution or solvent to extract, remove, or dissolve the $SiO_2$ nanoparticles 212 out of the slurry 220 may be hydrofluoric acid (HF).

In an illustrative embodiment, about 1M to about 10M sodium hydroxide (NaOH), including any specific molarity NaOH comprised therein, may be used to extract, dissolve, or remove the $SiO_2$ nanoparticles 212 out of the slurry 220. In another exemplary embodiment, about 1% to about 5% of HF in a water/ethanol mixture, including any specific percentage HF comprised therein, may be used to extract, dissolve, or remove the $SiO_2$ nanoparticles 212 out of the slurry 220. The slurry 220 may be exposed to the solution used to extract, dissolve, or remove the $SiO_2$ nanoparticles 212 out of the slurry 220 for about T hour to about 24 hours, including any specific or range of time period comprised therein.

In one embodiment, removal of $SiO_2$ nanoparticles 212 creates MPL pores 140 in the slurry 220. The MPL pores 140 in the slurry 220 may be macropores and/or mesopores/micropores. In one embodiment, macropores comprise a size ranging from about 200 nm to about 1 μm, including any specific size comprised therein. In one embodiment, mesopores or micropores comprise a size that is below 200 nm.

Figure 7B:
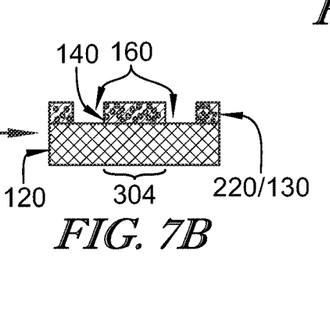
FIG. 7B is an illustration of a step of a method embodiment for fabricating the patterned microporous layer (MPL) of a fuel cell electrode comprising carbonizing the gas diffusion layer (GDL) coated with the slurry after removal of $SiO_2$ nanoparticles from the gas diffusion layer (GDL).

A second embodiment of the present method to fabricate the patterned microporous layer (MPL) 130 is also collectively shown in FIGS. 6B, 7B, and 8. In this method embodiment, the separate steps of 1) carbonizing the slurry 220 by heating or baking and 2) extracting, removing, or dissolving the silica nanoparticles 212 with NaOH or HF are performed as described in the first method embodiment described and collectively shown in FIGS. 6A, 7A, and 8. However, in this second method embodiment as compared to the first embodiment of the method, the separate steps of 1) carbonizing the slurry 220 by heating or baking and then 2) extracting, removing, or dissolving the silica nanoparticles 212 with NaOH or HF, are reversed. More specifically, as shown in FIG. 6B, the silica nanoparticles 212 are first extracted, removed, or dissolved with NaOH or HF from the slurry 220 to form the MPL pores 140. Afterwards, as shown in FIG. 7B, the slurry 220 is carbonized by heating or baking to make the slurry 220 and patterned MPL 130 electrically conductive.

As shown in FIG. 8, the resulting patterned microporous layer (MPL) 130 coating the gas diffusion layer (GDL) 120 comprises both flow pathways or flow features 160, as well as MPL pores 140. An illustrative embodiment of the present patterned MPL comprises at, about, greater than, or less than 2500 flow features 160 per 1 $mm^2$. An illustrative embodiment of the present patterned MPL comprises at, about, greater than, or less than 2500 MPL pores 140. An exemplary embodiment of the present patterned MPL 130 comprises a plurality of flow pathways or flow features 160 and a plurality of MPL pores 140. In one embodiment, an operator or designer does not control the number of flow features 160 or MPL pores 140 comprised in a patterned MPL 130.

As shown in FIG. 8, the resulting patterned microporous layer (MPL) 130 coating the gas diffusion layer (GDL) 120 is fluorinated with pentafluoride or penta-fluoryl functional groups. A chemical fluorination reaction occurs to attach the fluoride groups in order to create uniform hydrophobic surfaces in the MPL-GDL substrate 230. A catalyst layer may be added or applied to the MPL-GDL substrate 230 having the present patterned MPL 130 to produce the fuel cell electrode 100.

In some embodiments, the hydrophobicity of the MPL-GDL substrate 230 may be on the surfaces. In other embodiments, the hydrophobicity of the MPL-GDL substrate 230 may comprise the MPL pores 140, the gas diffusion layer (GDL) 120, and/or the patterned microporous layer (MPL) 130. The hydrophobicity of certain specific regions of the MPL-GDL substrate 230 (e.g., the MPL pores 140, the GDL 120, and the GDL pores 170) coupled with the hydrophilicity of certain other specific regions of the MPL-GDL substrate 230 (e.g., the flow pathways or features 160) allows for water to be pooled or selectively drawn to specific regions of the MPL-GDL substrate 230. In particular, the flow pathways or flow features 160 selectively remove water from the patterned MPL 130 and/or the catalyst layer 110 of the fuel cell electrode 100. These features and functions of the present fuel cell electrode 100 having a patterned MPL 130 provides unexpected improvement and optimization of the performance, durability, and life expectancy of a fuel cell.

The following numbered embodiments are contemplated and non-limiting:

1. A fuel cell comprising a catalyst layer, a patterned microporous layer comprising a plurality of pores that enable gas flow and one or more flow pathways that selectively enable the flow of liquid water, and a gas diffusion layer.
2. The fuel cell of clause 1, any other suitable clause, or any combination of suitable clauses, wherein the fuel cell includes a fuel cell electrode.
3. The fuel cell of clause 1, any other suitable clause, or any combination of suitable clauses, wherein the catalyst layer is separated from the gas diffusion layer by the patterned microporous layer.
4. The fuel cell of clause 1, any other suitable clause, or any combination of suitable clauses, wherein the catalyst layer is atop or above the patterned microporous layer, or below or beneath the patterned microporous layer.
5. The fuel cell of clause 1, any other suitable clause, or any combination of suitable clauses, wherein the catalyst layer comprises a top surface, a bottom surface, and a body.
6. The fuel cell of clause 1, any other suitable clause, or any combination of suitable clauses, wherein the patterned microporous layer is atop or above the gas diffusion layer, or below or beneath the gas diffusion layer.
7. The fuel cell of clause 1, any other suitable clause, or any combination of suitable clauses, wherein the patterned microporous layer is patterned with one or more pores, or the plurality of pores, and/or one or more flow features or one or more flow pathways.
8. The fuel cell of clause 7, any other suitable clause, or any combination of suitable clauses, wherein the patterned microporous layer comprises at, about, greater than, or less than 2500 pores and/or at, about, greater than, or less than 2500 flow features or pathways.
9. The fuel cell of clause 1, any other suitable clause, or any combination of suitable clauses, wherein the plurality of pores comprise a size or diameter small enough to prevent liquid water from entering or moving through the plurality of pores, or comprise a diameter of about 50 nm to about 300 nm, about 50 nm to about 100 nm, about 50 nm to about 75 nm, about 100 nm to about 200 nm, about 200 nm to about 300 nm, or any specific size, diameter, or range within those ranges.
10. The fuel cell of clause 1, any other suitable clause, or any combination of suitable clauses, wherein the plurality of pores are hydrophobic.
11. The fuel cell of clause 1, any other suitable clause, or any combination of suitable clauses, wherein the plurality of pores allow for the entry and or movement of hydrogen, oxygen, or other gases.
12. The fuel cell of clause 1, any other suitable clause, or any combination of suitable clauses, wherein the one or more flow pathways comprises rectangular, square, circular, or any other shape structures, or holes, channels, or some other form with at least one dimension large enough to allow the entry or movement of liquid water through the one or more flow pathways, or at least one dimension in a range of about 2 μm to about 50 μm, about 2 μm to about 10 μm, about 10 μm to about 20 μm, about 20 μm to about 30 μm, or about 30 μm to about 50 μm, or any specific size, diameter, or range within those ranges.
13. The fuel cell of clause 1, any other suitable clause, or any combination of suitable clauses, wherein a first flow pathway is separated from a second flow pathway by a pitch distance of about 2 μm to about 100 μm, about 2 μm to about 10 μm, about 10 μm to about 30 μm, about 30 μm to about 50 μm, about 50 μm to about 75 μm, about 75 μm to about 100 μm, or any specific size, diameter, or range within those ranges.
14. The fuel cell of clause 13, any other suitable clause, or any combination of suitable clauses, wherein the pitch distance is the distance between a center point of one flow pathway to a center point of another flow pathway, or the distance between a center point of a top surface of one flow pathway to the a center point of a top surface of the next or closest flow pathway.
15. The fuel cell of clause 13, any other suitable clause, or any combination of suitable clauses, wherein the pitch distance is equal to, about equal to, or more than the sum of a thickness of the patterned microporous layer and a thickness of the catalyst layer.
16. The fuel cell of clause 15, any other suitable clause, or any combination of suitable clauses, wherein the thickness of the patterned microporous layer is about 10 μm, the thickness of the catalyst layer is about 20 μm, and the pitch distance is at, about, more than, or not greater than 30 μm.
17. The fuel cell of clause 16, any other suitable clause, or any combination of suitable clauses, wherein the pitch distance ranges from about 30 μm to about 50 μm or from about 30 μm to about 60 μm
18. The fuel cell of clause 1, any other suitable clause, or any combination of suitable clauses, wherein the one or more flow pathways is hydrophilic or hydrophobic.
19. The fuel cell of clause 1, any other suitable clause, or any combination of suitable clauses, wherein the one or more flow pathways is one or more flow features.
20. The fuel cell of clause 1, any other suitable clause, or any combination of suitable clauses, wherein the one or more flow pathways selectively remove water from the patterned microporous layer and/or the catalyst layer.
21. The fuel cell of clause 1, any other suitable clause, or any combination of suitable clauses, wherein the one or more flow pathways connect the catalyst layer to the gas diffusion layer.
22. The fuel cell of clause 1, any other suitable clause, or any combination of suitable clauses, wherein the one or more flow pathways directs and/or removes liquid water from the catalyst layer.
23. The fuel cell of clause 1, any other suitable clause, or any combination of suitable clauses, wherein the gas diffusion layer comprises a top surface, a bottom surface, and a body.
24. The fuel cell of clause 23, any other suitable clause, or any combination of suitable clauses, wherein the top surface, bottom surface, or body of the gas diffusion layer is connected to the top surface, bottom surface, or body of the catalyst layer by one or more flow pathways or one or more flow features.
25. The fuel cell of clause 1, any other suitable clause, or any combination of suitable clauses, wherein the gas diffusion layer is patterned with a plurality of pores.
26. The fuel cell of clause 25, any other suitable clause, or any combination of suitable clauses, wherein the plurality of pore comprise a size or diameter of about 50 nm to about 100 nm, about 50 nm to about 60 nm, about 60 nm to about 70 nm, about 70 nm to about 100 nm, any specific size, diameter, or range within those ranges, or greater than 100 nm.
27. A method of fabricating a patterned microporous layer in a fuel cell electrode comprising mixing a photoresist and a plurality of solid SiO2 nanoparticles to form a slurry in the patterned microporous layer, coating the slurry on a gas diffusion layer to form a coated gas diffusion layer, selectively exposing the slurry coated gas diffusion layer to UV light, applying a developer solution to the slurry coated gas diffusion layer to form one or more flow pathways in the patterned microporous layer, carbonizing the patterned microporous layer, removing the plurality of SiO2 nanoparticles from the patterned microporous layer to create a plurality of pores, and fluorinating the patterned microporous layer.
28. The method of clause 27, any other suitable clause, or any combination of suitable clauses, wherein the catalyst layer comprises a top surface, a bottom surface, and a body.
29. The method of clause 27, any other suitable clause, or any combination of suitable clauses, wherein the patterned microporous layer is atop or above the gas diffusion layer, or below or beneath the gas diffusion layer.
30. The method of clause 27, any other suitable clause, or any combination of suitable clauses, wherein the fuel cell electrode further comprises a catalyst layer.
31. The method of clause 30, any other suitable clause, or any combination of suitable clauses, wherein the catalyst layer is separated from the gas diffusion layer by the patterned microporous layer.
32. The method of clause 30, any other suitable clause, or any combination of suitable clauses, wherein the catalyst layer is atop or above the patterned microporous layer, or below or beneath the patterned microporous layer.
33. The method of clause 32, any other suitable clause, or any combination of suitable clauses, wherein the catalyst layer comprises a top surface, a bottom surface, and a body.
34. The method of clause 27, any other suitable clause, or any combination of suitable clauses, wherein the mixing of the slurry occurs by ultrasonication, magnetic stirring, bead milling, mechanical agitation, agitation with a blade, agitation with a propeller, probe sonication, high shear mixing, microfluidization, or any method known in the art.
35. The method of clause 27, any other suitable clause, or any combination of suitable clauses, wherein the photoresist is a liquid, liquid solution, or a nonconductive polymeric material that becomes electrically conductive when the photoresist is carbonized or exposed to carbon.
36. The method of clause 27, any other suitable clause, or any combination of suitable clauses, wherein the photoresist is a positive photoresist or a negative photoresist.
37. The method of clause 36, any other suitable clause, or any combination of suitable clauses, wherein the positive photoresist or the negative photoresist is diluted with propylene glycol methyl ether acetate (PGMEA) or other solvents.
38. The method of clause 27, any other suitable clause, or any combination of suitable clauses, wherein the plurality of solid SiO2 nanoparticles comprise a diameter of about 50 nm to 300 nm, or any specific size, diameter, or range within that range.
39. The method of clause 27, any other suitable clause, or any combination of suitable clauses, wherein the slurry comprises about 5% to about 15% solid SiO2 nanoparticles and about 85% to 95% liquid photoresist, about 15% to about 25% solid SiO2 nanoparticles and about 75% to 85% liquid photoresist, more than 25% solid SiO2 nanoparticles and less than 75% liquid photoresist, less than 5% SiO2 nanoparticles and more than 95% liquid photoresist, or any specific percentages of solid SiO2 nanoparticles and liquid photoresist within those ranges which sum to 100%.
40. The method of clause 27, any other suitable clause, or any combination of suitable clauses, wherein the slurry is coated on a substrate comprising the gas diffusion layer (GDL) to form a MPL-GDL substrate.
41. The method of clause 40, any other suitable clause, or any combination of suitable clauses, wherein the MPL-GDL substrate is heated to high temperatures ranging from about 80° C. to about 120° C., any specific temperature or range of temperature comprised within that range, or other high temperatures.
42. The method of clause 40, any other suitable clause, or any combination of suitable clauses, wherein the MPL-GDL substrate is heated at high temperatures for a timeframe ranging from about 10 seconds to about 120 seconds, or any specific time period or range of time period comprised within that range.
43. The method of clause 40, any other suitable clause, or any combination of suitable clauses, wherein the MPL-GDL substrate is heated to high temperatures by baking or any other mechanism known in the art.
44. The method of clause 40, any other suitable clause, or any combination of suitable clauses, wherein a mask is placed atop the MPL-GDL substrate.
45. The method of clause 44, any other suitable clause, or any combination of suitable clauses, wherein the mask is directly aligned against the MPL-GDL substrate to contact the coated slurry or the photoresist.
46. The method of clause 44, any other suitable clause, or any combination of suitable clauses, wherein the mask is indirectly aligned against the MPL-GDL substrate to not be in direct contact with the coated slurry or the photoresist.

47. The method of clause 44, any other suitable clause, or any combination of suitable clauses, wherein the mask comprises or is made of chrome, any material that would block or prevent the penetration of UV light from reaching all or a portion of the coated slurry, or any material that may block or cover all or a portion of the coated slurry.
48. The method of clause 44, any other suitable clause, or any combination of suitable clauses, wherein the mask has mask features or characteristics to create the flow pathways in the patterned microporous layer.
49. The method of clause 48, any other suitable clause, or any combination of suitable clauses, wherein the mask features or characteristics rectangular, square, circular, or any other shape structures, or holes, channels, or some other form with at least one dimension in a range of about 2 μm to about 50 μm, about 2 μm to about 10 μm, about 10 μm to about 20 μm, about 20 μm to about 30 μm, or about 30 μm to about 50 μm, or any specific size, diameter, or range within those ranges.
50. The method of clause 48, any other suitable clause, or any combination of suitable clauses, wherein the mask features or characteristics dictate, produce, and/or directly correlate with the shape, size, and/or depth of the resulting flow pathways.
51. The method of clause 40, any other suitable clause, or any combination of suitable clauses, wherein the MPL-GDL substrate is hydrophobic.
52. The method of clause 51, any other suitable clause, or any combination of suitable clauses, wherein the hydrophobicity of the MPL-GDL substrate comprises the plurality of pores of the gas diffusion layer and/or the microporous layer, the surfaces of the gas diffusion layer, and/or the surfaces microporous layer.
53. The method of clause 51, any other suitable clause, or any combination of suitable clauses, wherein the hydrophobicity of any region of the MPL-GDL substrate allows for water to be pooled or selectively drawn to specific regions of the MPL-GDL substrate.
54. The method of clause 27, any other suitable clause, or any combination of suitable clauses, wherein the coated slurry that comprises positive photoresist can be dissolved in the developer solution.
55. The method of clause 27, any other suitable clause, or any combination of suitable clauses, wherein the coated slurry that comprises negative photoresist cannot be dissolved in the developer solution.
56. The method of clause 27, any other suitable clause, or any combination of suitable clauses, wherein the gas diffusion layer comprises a top surface, a bottom surface, and a body.
57. The method of clause 56, any other suitable clause, or any combination of suitable clauses, wherein the top surface, bottom surface, or body of the gas diffusion layer is connected to the top surface, bottom surface, or body of the catalyst layer by one or more flow pathways or one or more flow features.
58. The method of clause 27, any other suitable clause, or any combination of suitable clauses, wherein the gas diffusion layer is patterned with a plurality of pores.
59. The method of clause 58, any other suitable clause, or any combination of suitable clauses, wherein the plurality of pore comprise a size or diameter of about 50 nm to about 100 nm, about 50 nm to about 60 nm, about 60 nm to about 70 nm, about 70 nm to about 100 nm, any specific size, diameter, or range within those ranges, or greater than 100 nm.
60. The method of clause 27, any other suitable clause, or any combination of suitable clauses, wherein the step of selectively exposing the slurry to the UV light comprises the mask.
61. The method of clause 27, any other suitable clause, or any combination of suitable clauses, wherein the UV light loosens the slurry comprising the positive photoresist atop the gas diffusion layer that is not covered or protected by the mask.
62. The method of clause 27, any other suitable clause, or any combination of suitable clauses, wherein the UV light hardens the slurry comprising the negative photoresist atop the gas diffusion layer that is not covered or protected by the mask.
63. The method of clause 27, any other suitable clause, or any combination of suitable clauses, wherein the UV light is provided to the slurry at a wavelength at about 200 nm to about 500 nm, about 300 nm to about 500 nm, 300 nm to about 350 nm, or any specific wavelength comprised within those ranges.
64. The method of clause 27, any other suitable clause, or any combination of suitable clauses, wherein the UV light is applied to the slurry for a timeframe ranging from about 2 to 30 seconds, or any specific time period comprised within that range.
65. The method of clause 27, any other suitable clause, or any combination of suitable clauses, wherein the developer solution is applied to the slurry by agitation and/or washing for about 2 seconds to about 120 seconds, including any specific time period comprised within that range.
66. The method of clause 27, any other suitable clause, or any combination of suitable clauses, wherein the developer solution is a solvent, an organic solvent, a solution or solvent specific to the positive photoresist, a solution or solvent specific to the negative photoresist, or PGMEA.
67. The method of clause 27, any other suitable clause, or any combination of suitable clauses, wherein the one or more flow pathways are formed in regions where the mask exposes the slurry coating of the gas diffusion layer to the UV light when the slurry comprises the positive photoresist and when the coated slurry exposed to the UV light is removed.
68. The method of clause 27, any other suitable clause, or any combination of suitable clauses, wherein the one or more flow pathways are formed in regions where the mask protects the slurry coating of the gas diffusion layer from the UV light when the slurry comprises the negative photoresist.
69. The method of clause 27, any other suitable clause, or any combination of suitable clauses, wherein the one or more flow pathways comprises rectangular, square, circular, or any other shape structures, or holes, channels, or some other form with at least one dimension large enough to allow the entry or movement of liquid water through the one or more flow pathways, or at least one dimension in a range of about 2 μm to about 50 μm, about 2 μm to about 10 μm, about 10 μm to about 20 μm, about 20 μm to about 30 μm, or about 30 μm to about 50 μm, or any specific size, diameter, or range within those ranges.
70. The method of clause 69, any other suitable clause, or any combination of suitable clauses, wherein the dimension or shape of the one or more flow pathways is based on user need, or the dimension/and or shape of the mask features or characteristics.

71. The method of clause 27, any other suitable clause, or any combination of suitable clauses, wherein a first flow pathway is separated from a second flow pathway by a pitch distance of about 2 µm to about 100 µm, about 2 µm to about 10 µm, about 10 µm to about 30 µm, about 30 µm to about 50 µm, about 50 µm to about 75 µm, about 75 µm to about 100 µm, or any specific size, diameter, or range within those ranges.
72. The method of clause 71, any other suitable clause, or any combination of suitable clauses, wherein the pitch distance is the distance between a center point of one flow pathway to a center point of another flow pathway, or the distance between a center point of a top surface of one flow pathway to the a center point of a top surface of the next or closest flow pathway.
73. The method of clause 71, any other suitable clause, or any combination of suitable clauses, wherein the pitch distance is equal to, about equal to, or more than the sum of a thickness of the patterned microporous layer and a thickness of the catalyst layer.
74. The method of clause 73, any other suitable clause, or any combination of suitable clauses, wherein the thickness of the patterned microporous layer is about 10 µm, the thickness of the catalyst layer is about 20 µm, and the pitch distance is at, about, more than, or not greater than 30 µm.
75. The method of clause 74, any other suitable clause, or any combination of suitable clauses, wherein the pitch distance ranges from about 30 µm to about 50 µm or from about 30 µm to about 60 µm.
76. The method of clause 71, any other suitable clause, or any combination of suitable clauses, wherein the pitch distance is designed, manufactured, and/or manipulated by a user or operator.
77. The method of clause 27, any other suitable clause, or any combination of suitable clauses, wherein the one or more flow pathways is hydrophilic or hydrophobic.
78. The method of clause 27, any other suitable clause, or any combination of suitable clauses, wherein the one or more flow pathways is one or more flow features.
79. The method of clause 27, any other suitable clause, or any combination of suitable clauses, wherein the shape, size, location, number, and or depth of the one or more flow pathways is determined, selected and/or controlled by a human operator or designer, or by imprinting a pattern on or into the mask.
80. The method of clause 27, any other suitable clause, or any combination of suitable clauses, wherein the one or more flow pathways penetrate only the patterned microporous layer, only the gas diffusion layer, or both the patterned microporous layer and the gas diffusion layer.
81. The method of clause 27, any other suitable clause, or any combination of suitable clauses, wherein the one or more flow pathways do not at all or only minimally penetrate the catalyst layer.
82. The method of clause 27, any other suitable clause, or any combination of suitable clauses, wherein the one or more flow pathways selectively remove water from the patterned microporous layer and/or the catalyst layer.
83. The method of clause 27, any other suitable clause, or any combination of suitable clauses, wherein the one or more flow pathways connect the catalyst layer to the gas diffusion layer.
84. The method of clause 27, any other suitable clause, or any combination of suitable clauses, wherein the one or more flow pathways directs and/or removes liquid water from the catalyst layer.
85. The method of clause 27, any other suitable clause, or any combination of suitable clauses, wherein the step of carbonizing the patterned microporous layer includes heating or baking the MPL-GDL substrate at a temperature of about 600° C. to about 1500° C., about 900° C. to about 1500° C., greater than 900° C., or any specific temperature comprised within those ranges.
86. The method of clause 85, any other suitable clause, or any combination of suitable clauses, wherein the MPL-GDL substrate is heated or baked for about 30 minutes to about 120 minutes, including any specific time period comprised within that range.
87. The method of clause 85, any other suitable clause, or any combination of suitable clauses, wherein the MPL-GDL substrate is heated or baked in a non-oxidizing atmosphere.
88. The method of clause 87, any other suitable clause, or any combination of suitable clauses, wherein the non-oxidizing atmosphere comprises argon, nitrogen, hydrogen, and/or a vacuum.
89. The method of clause 27, any other suitable clause, or any combination of suitable clauses, wherein the step of removing the plurality of SiO2 nanoparticles from the patterned microporous layer to create a plurality of pores includes exposing the slurry to an additional solution or solvent.
90. The method of clause 89, any other suitable clause, or any combination of suitable clauses, wherein the additional solution or solvent is sodium hydroxide, hydrofluoric acid, about 1M to about 10M sodium hydroxide with any specific molarity of hydrofluoric acid comprised therein, or about 1% to about 5% of hydrofluoric acid in a water and ethanol mixture with any specific percentage hydrofluoric acid comprised therein.
91. The method of clause 89, any other suitable clause, or any combination of suitable clauses, wherein the slurry is exposed to the additional solution or solvent for about one hour to about 24 hours, or any specific time period or range of time period comprised therein.
92. The method of clause 89, any other suitable clause, or any combination of suitable clauses, wherein the plurality of pores comprise a size or diameter of about 50 nm to about 300 nm, about 50 nm to about 100 nm, about 50 nm to about 75 nm, about 100 nm to about 200 nm, about 200 nm to about 300 nm, or any specific size, diameter, or range within those ranges.
93. The method of clause 89, any other suitable clause, or any combination of suitable clauses, wherein the plurality of pores are hydrophobic.
94. The method of clause 89, any other suitable clause, or any combination of suitable clauses, wherein the plurality of pores allow for the entry and or movement of hydrogen, oxygen, or other gases.
95. The method of clause 89, any other suitable clause, or any combination of suitable clauses, wherein the plurality of pores are macropores and/or mesopores or micropores.
96. The method of clause 95, any other suitable clause, or any combination of suitable clauses, wherein the macropores comprise a size or diameter of about 200 nm to about 1 µm, or any specific size comprised therein.
97. The method of clause 95, any other suitable clause, or any combination of suitable clauses, wherein the mesopores or the micropores comprise a size or diameter less than 200 nm.

98. The method of clause 27, any other suitable clause, or any combination of suitable clauses, wherein the step of removing the plurality of SiO2 nanoparticles from the patterned microporous layer to create a plurality of pores includes exposing the slurry to an additional solution or solvent is before the step of carbonizing the patterned microporous layer.

99. The method of clause 27, any other suitable clause, or any combination of suitable clauses, wherein before or after the step of fluorinating the patterned microporous layer, the patterned microporous layer (MPL) is patterned with one or more pores, or the plurality of pores, and/or one or more flow features or one or more flow pathways.

100. The method of clause 99, any other suitable clause, or any combination of suitable clauses, wherein the patterned microporous layer comprises at, about, greater than, or less than 2500 pores and/or at, about, greater than, or less than 2500 flow features or pathways.

102. The method of clause 99, any other suitable clause, or any combination of suitable clauses, wherein the amount of pores and/or flow features or pathways is not controlled by an operator or designer.

103. The method of clause 27, any other suitable clause, or any combination of suitable clauses, wherein the step of fluorinating the patterned microporous layer includes fluorinating with pentafluoride or penta-fluoryl functional groups.

104. The method of clause 27, any other suitable clause, or any combination of suitable clauses, wherein the step of fluorinating the patterned microporous layer includes a chemical fluorination reaction which attaches fluoride groups to create uniform hydrophobic surfaces in the MPL-GDL substrate.

105. The fuel cell of clause 1, any other suitable clause, or any combination of suitable clauses, wherein the fuel cell is a proton exchange membrane fuel cell, a phosphoric acid fuel cell, a molten carbonate fuel cell, or a solid oxide fuel cells.

106. The method of clause 27, any other suitable clause, or any combination of suitable clauses, wherein the fuel cell is a proton exchange membrane fuel cell, a phosphoric acid fuel cell, a molten carbonate fuel cell, or a solid oxide fuel cells.

107. A method of fabricating a patterned microporous layer in a fuel cell electrode comprising mixing a photoresist and a plurality of solid $SiO_2$ nanoparticles to form a slurry in the patterned microporous layer, coating the slurry on a gas diffusion layer to form a slurry coated gas diffusion layer, aligning a mask over the slurry coated gas diffusion layer, selectively exposing the slurry coated gas diffusion layer to UV light, applying a developer solution to the slurry coated gas diffusion layer to form one or more flow pathways in the patterned microporous layer, carbonizing the patterned microporous layer, removing the plurality of $SiO_2$ nanoparticles from the patterned microporous layer to create a plurality of pores, and fluorinating the patterned microporous layer.

108. The method of clause 107, any other suitable clause, or any combination of suitable clauses, wherein the $SiO_2$ nanoparticles comprises a diameter of about 50 nm to about 300 nm.

109. The method of clause 107, any other suitable clause, or any combination of suitable clauses, wherein the slurry comprises a negative photoresist or a positive photoresist.

110. The method of clause 107, any other suitable clause, or any combination of suitable clauses, wherein aligning a mask over the slurry coated gas diffusion layer and selectively exposing the slurry coated gs diffusion layer to UV light comprises a chrome mask.

111. The method of clause 107, any other suitable clause, or any combination of suitable clauses, wherein the plurality of pores are hydrophobic.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A fuel cell comprising:
a catalyst layer,
a gas diffusion layer, and
a patterned microporous layer comprising:
a distribution of a plurality of pores that comprise a diameter configured to enable gas flow and prevent entry or flow of liquid water, and
a distribution of one or more flow pathways that enable entry or flow of liquid water.

2. The fuel cell of claim 1, wherein the diameter of the plurality of pores ranges from about 50 nm to about 300 nm.

3. The fuel cell of claim 1, wherein the one or more flow pathways comprise rectangular, square, or circular structures with at least one dimension in a range of about 2 μm to about 50 μm.

4. The fuel cell of claim 1, wherein a first flow pathway is separated from a second flow pathway by a pitch distance ranging from about 2 μm to about 100 μm.

5. The fuel cell of claim 1, wherein the one or more flow pathways are hydrophilic or hydrophobic.

6. The fuel cell of claim 1, wherein the plurality of pores are hydrophobic.

7. A method of fabricating a patterned microporous layer in a fuel cell electrode comprising:
mixing a photoresist and a plurality of solid SiO2 nanoparticles to form a slurry in the patterned microporous layer,
coating the slurry on a gas diffusion layer to form a slurry coated gas diffusion layer,
selectively exposing the slurry coated gas diffusion layer to UV light,
applying a developer solution to the slurry coated gas diffusion layer to form one or more flow pathways in the patterned microporous layer,
carbonizing the patterned microporous layer,
removing the plurality of solid $SiO_2$ nanoparticles from the patterned microporous layer to create a plurality of pores, and
fluorinating the patterned microporous layer.

8. The method of claim 7, wherein the plurality of solid $SiO_2$ nanoparticles comprise a diameter ranging from about 50 nm to about 300 nm.

9. The method of claim 7, wherein the slurry comprises a negative photoresist or a positive photoresist.

10. The method of claim 7, wherein selectively exposing the slurry coated gas diffusion layer to UV light comprises a mask.

11. The method of claim 10, further comprising aligning the mask over the slurry coated gas diffusion layer.

12. The method of claim 7, further comprising aligning a mask over the slurry coated gas diffusion layer.

13. The method of claim 7, wherein the plurality of pores are hydrophobic.

14. A method of fabricating a patterned microporous layer in a fuel cell electrode comprising:
mixing a photoresist and a plurality of solid SiO2 nanoparticles to form a slurry in the patterned microporous layer,
coating the slurry on a gas diffusion layer to form a slurry coated gas diffusion layer,
aligning a mask over the slurry coated gas diffusion layer,
selectively exposing the slurry coated gas diffusion layer to UV light,
applying a developer solution to the slurry coated gas diffusion layer to form one or more flow pathways in the patterned microporous layer, carbonizing the patterned microporous layer,
removing the plurality of solid $SiO_2$ nanoparticles from the patterned microporous layer to create a plurality of pores, and
fluorinating the patterned microporous layer.

15. The method of claim 14, wherein the plurality of solid $SiO_2$ nanoparticles comprise a diameter ranging from about 50 nm to about 300 nm.

16. The method of claim 14, wherein the slurry comprises a negative photoresist or a positive photoresist.

17. The method of claim 14, wherein aligning the mask over the slurry coated gas diffusion layer and selectively exposing the slurry coated gas diffusion layer to UV light comprises a chrome mask.

18. The method of claim 14, wherein the plurality of pores are hydrophobic.

19. The method of claim 14, wherein the one or more flow pathways comprise rectangular, square, or circular structures with at least one dimension in a range of about 2 μm to about 50 μm.

20. The method of claim 14, wherein a first flow pathway is separated from a second flow pathway by a pitch distance of about 2 μm to about 100 μm.

* * * * *